United States Patent
Pate et al.

(10) Patent No.: US 6,768,748 B2
(45) Date of Patent: Jul. 27, 2004

(54) FLEXIBLE MAPPING OF CIRCUITS INTO PACKETS

(75) Inventors: Prayson Will Pate, Durham, NC (US); Michael Joseph Poupard, Youngsville, NC (US); Robert Leroy Lynch, Raleigh, NC (US); David Stephen Griswold, Chapel Hill, NC (US); Emily Jean Skinner, Raleigh, NC (US)

(73) Assignee: Overture Networks, Inc., Morrisville, NC (US)

( * ) Notice: Subject to any disclaimer, the term of this patent is extended or adjusted under 35 U.S.C. 154(b) by 0 days.

(21) Appl. No.: 10/206,136

(22) Filed: Jul. 26, 2002

(65) Prior Publication Data

US 2003/0091052 A1 May 15, 2003

Related U.S. Application Data

(60) Provisional application No. 60/308,738, filed on Jul. 30, 2001.

(51) Int. Cl.[7] ............................................. H04L 12/28
(52) U.S. Cl. ...................................... 370/519; 370/252
(58) Field of Search ................................ 370/241, 252, 370/350, 519, 400, 352, 473, 474

(56) References Cited

U.S. PATENT DOCUMENTS

| | | | | |
|---|---|---|---|---|
| 5,878,032 A | * | 3/1999 | Mirek et al. ................. | 370/252 |
| 6,058,102 A | | 5/2000 | Drysdale et al. | |
| 6,118,765 A | | 9/2000 | Phillips | |
| 6,304,567 B1 | * | 10/2001 | Rosenberg .................. | 370/356 |
| 6,324,170 B1 | | 11/2001 | McClennon et al. | |
| 6,445,681 B1 | | 9/2002 | Pogrebinsky | |
| 6,532,211 B1 | * | 3/2003 | Rathonyi et al. ........... | 370/230 |
| 6,545,979 B1 | * | 4/2003 | Poulin ...................... | 370/241.1 |
| 6,603,759 B1 | | 8/2003 | Moskal et al. | |
| 2001/0015956 A1 | * | 8/2001 | Ono .......................... | 370/229 |

OTHER PUBLICATIONS

Jacobson et al. "TCP Extensions for High Performance". RFC 1323. May 1992. Pp. 1–37.*
Lin et al. "Traffic Smoothing by Inter-departure Time Control in ATM Adapatation Layer" IEEE. Dec. 10, 1997–Dec. 12, 1997. Pp. 3544–3549.*
*Frame Relay Operations, Administration, and Maintenance Implementation Agreement*, FRF 19 Frame Relay Forum Technical Committee, Mar. 2001 (59 pages).

* cited by examiner

*Primary Examiner*—Chi Pham
*Assistant Examiner*—Derrick W. Ferris
(74) *Attorney, Agent, or Firm*—Kevin E. Flynn; Daniels Daniels & Verdonik, P.A.

(57) ABSTRACT

A system for optimally mapping circuits into packets based on round trip delay (RTD), and a system for measuring RTD for use in packet communications systems such as circuit emulation (CEM) systems is disclosed. The measured RTD value can be used in a system that adjusts packet size to reduce capture delay to partially offset an increase in RTD. As the use of smaller packets increases the overhead burden on the packet communication system, the packet size can be increased to reduce the overhead burden when the size of the current RTD becomes appropriately short. The disclosure also teaches the placement of data from two or more circuits destined for the same emulation endpoint into the same transmission packet in order to improve system performance. The abstract is a tool for finding relevant disclosures and not a limitation on the scope of the claims.

4 Claims, 10 Drawing Sheets

State Machine for Control of FPP

Figure 1: CEM PDU Format

Figure 2: Format for Multiple CEM PDUs in One Packet

Figure 3: Format for CEM over IP

Figure 4: Format for CEM/IP over Untagged Ethernet

Figure 5: Format for CEM/IP Over VLAN Tagged Ethernet

Figure 6: Format for CEM over MPLS

Figure 7: Format for CEM/MPLS over Untagged Ethernet

Figure 9: Timer State Machine

Figure 10: State Machine for Control of FPP

FLEXIBLE MAPPING OF CIRCUITS INTO PACKETS

This application claims priority from co-pending U.S. Provisional Patent Application No. 60/308,738 filed Jul. 30, 2001 for Flexible Mapping of Circuits into Packets.

FIELD OF THE INVENTION

This invention relates to communications systems and methods, in particular, to packet communication systems and methods.

BACKGROUND OF THE INVENTION

Circuit emulation (CEM) systems, such as ATM CES, map native circuit frames received from a circuit into packets or cells. Sometimes this mapping is designed to minimize delay, as with ATM CES. Minimization of delay is accomplished by creating small packets, which minimizes the "capture delay". Capture delay is the time that it takes to acquire enough incoming circuit frames to create a packet. The drawback to minimizing capture delay is that the ratio of overhead (non-data control information) to data can be high, which leads to inefficient use of bandwidth. Other mappings are designed to increase efficiency and minimize overhead by increasing the number of transported frames, while holding constant the amount of overhead data. Reducing the percentage of overhead in this fashion has the disadvantage of increasing the capture delay.

Capture delay is one component in the round trip delay (RTD) for a packet to travel from one unit across the network to a second unit and then for a packet to return back from the second unit across the network to the first unit. The prior art has included means for measuring round trip delay, but these means have required the use of special test packets that were sent periodically. The use of periodic test packets adds to the overhead because these packets do not carry a CEM payload. The use of periodic test packets adds another tradeoff between having recent representative data on RTD and sending a large number of test packets without CEM payloads. The term payload is being use here and in the claims that follow to designate "real data" in contrast with packet headers, various types of overhead for sending control data, and dummy data that is called "filler" or "stuff". Delivering real data ("payloads") is the purpose for having a system, and everything else just facilitates that process.

Thus, prior art solutions have forced a fixed choice on the number of payload frames per CEM packet and thus a fixed choice between inefficient use of bandwidth or increasing the capture delay. A further shortcoming is that the prior art has not provided a method of collecting RTD while continuing to carry CEM payloads.

It is therefore an object of the invention to define a flexible mapping of circuits into packets. This method will allow flexibility in these dimensions:

The amount of data from a given circuit can be varied manually or automatically based on the measured end-to-end delay or round trip delay (RTD). The amount of data mapped to each packet is inversely proportional to the measured round trip delay.

If two or more circuits are destined for the same emulation endpoint, their data may be manually or automatically mapped into the same packet.

It is furthermore the object of this invention to provide a simple means of measuring RTD based on timestamps carried in a CEM packet that also conveys CEM payloads.

SUMMARY

This disclosure provides a method for dynamically adjusting the number of data frames placed in a data unit or packet based on one or more recent measurements of round trip delay from the source device to a target device and back. Also disclosed is a method for measuring round trip delay by capturing certain relevant time values and transmitting these values within the packets carrying data frames so that new measurements of round trip delay can be made without the use of control packets that do not carry data frames.

Data structures for use with the disclosed methods are provided for a variety of protocols.

DETAILED DESCRIPTION OF THE PREFERRED EMBODIMENT

CEM Format

Figure 1:
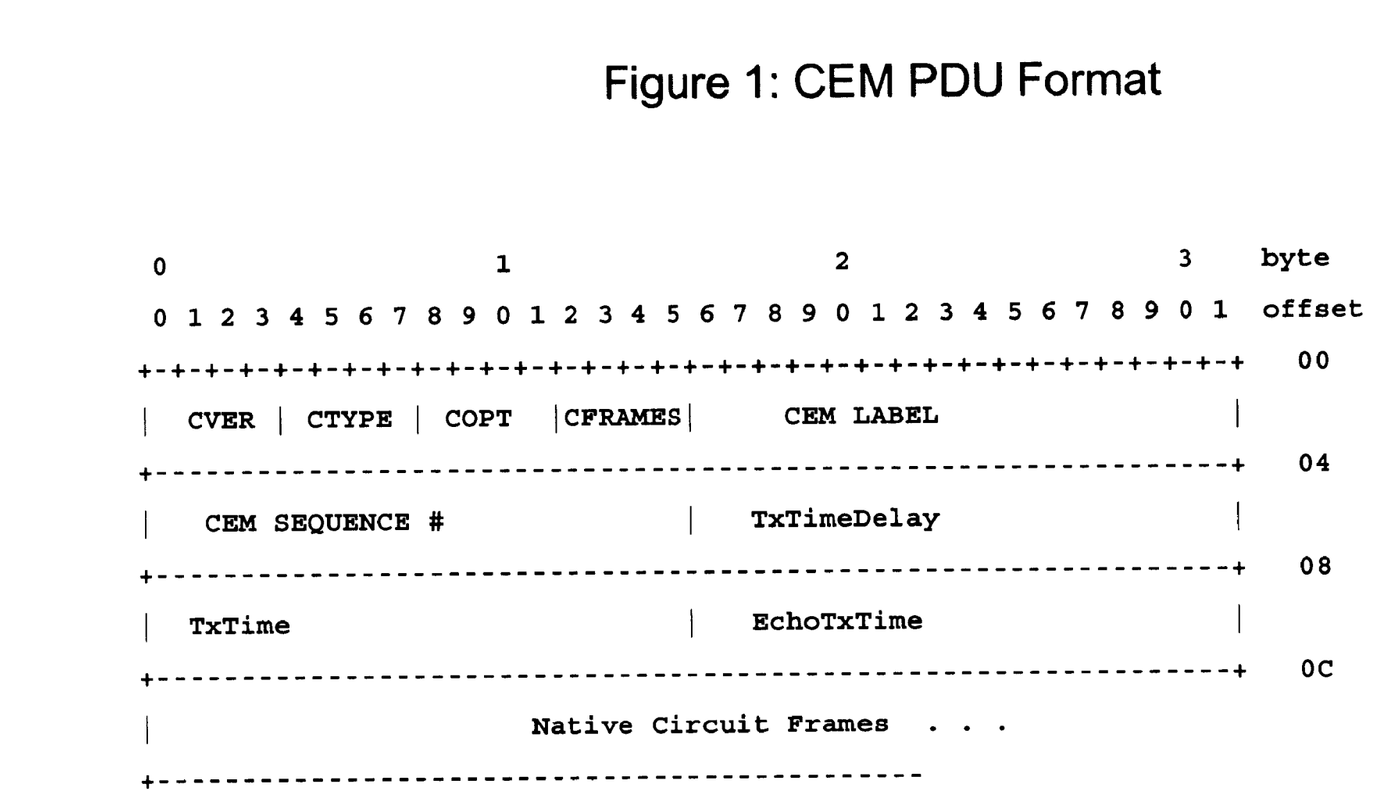
FIG. 1 shows the layout of the CEM Protocol Data Unit (PDU) in accordance with one version of the present invention.

The layout of the CEM Protocol Data Unit (PDU) is shown in FIG. 1

The CEM header is 12 bytes in length, and it is used by the CEM application to multiplex and demultiplex circuits, detect packet loss, maintain packet order, and compute packet network transit delay. A variable number of bytes of Time Division Multiplexing (TDM) data may be carried. Table 1 describes the fields of the CEM Header.

TABLE 1

CEM Header Fields

| Field | Description | Values | Size |
|---|---|---|---|
| CVER | Circuit Emulation Version | | 4 bits |
| CTYPE | Circuit Type (T1, E1, T3, E3, OC3, OC12) | 0 = T1, 1 = E1, 2 = T3, 3 = E3, 4 = OC3, 5 = OC12 | 4 bits |
| COPT | Bit mask of options | 0xAA55 | 4 bits |
| TxTime | TxTime is valid | 1 = valid, 0 = invalid | 1 bit |
| EchoTxTime | EchoTxTime is valid | 1 = valid, 0 = invalid | 1 bit |
| TxTimeDelay | TxTimeDelay is valid | 1 = valid, 0 = invalid | 1 bit |
| More | More CEM frames after this one | 1 = more, 0 = this is the last | 1 bit |
| CFRAMES | Number of Native Circuit Frames contained in the packet | 1 to 15, 0 = 16 frames | 4 bits |
| CEM LABEL | Circuit Emulation Label | | 16 bits |
| CEM SEQUENCE# | Sequence Number for packet loss detection and reordering | 0 to 65535 | 16 bits |
| TxTimeDelay | Clock ticks between receipt of Transmit Timestamp and transmission of this packet. This is used to account for holding delay. | # of 125 µs ticks | 16 Bits |
| TxTime | Transmit Timestamp | In units of 125 µs ticks | 16 Bits |
| EchoTxTime | The last captured TxTime from the Far Side | In units of 125 µs ticks | 16 Bits |

Figure 2:
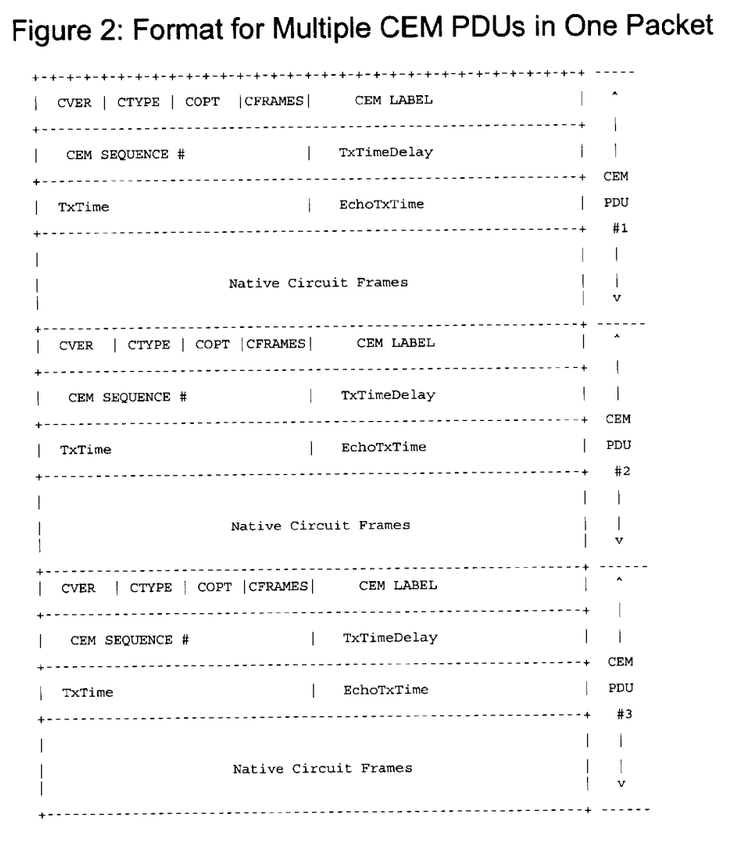
FIG. 2 shows the placement of multiple CEM PDUs in the same packet in accordance with another version of the present invention.

Multiple CEM PDUs can be placed in the same packet, as shown in FIG. 2. For the PDUs shown in FIG. 2, the "More" bit in the COPT field would be set to "1" for CEM PDUs #1 and #2 and to "0" for PDU #3.

CEM Mappings

CEM Over IP Format

Figure 3:
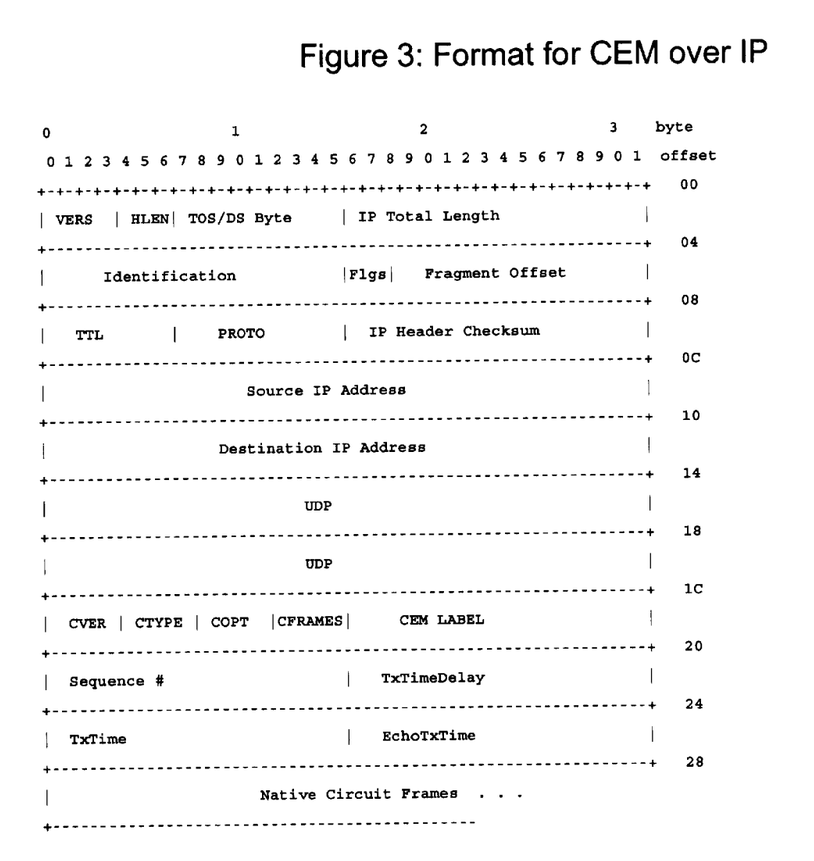
FIG. 3 shows a standard TCP/IP UDP packet to carry the CEM data in accordance with another version of the present invention.

The mapping of CEM to IP uses a standard TCP/IP UDP packet to carry the CEM data. The layout of this packet is shown in FIG. 3.

Figure 4:
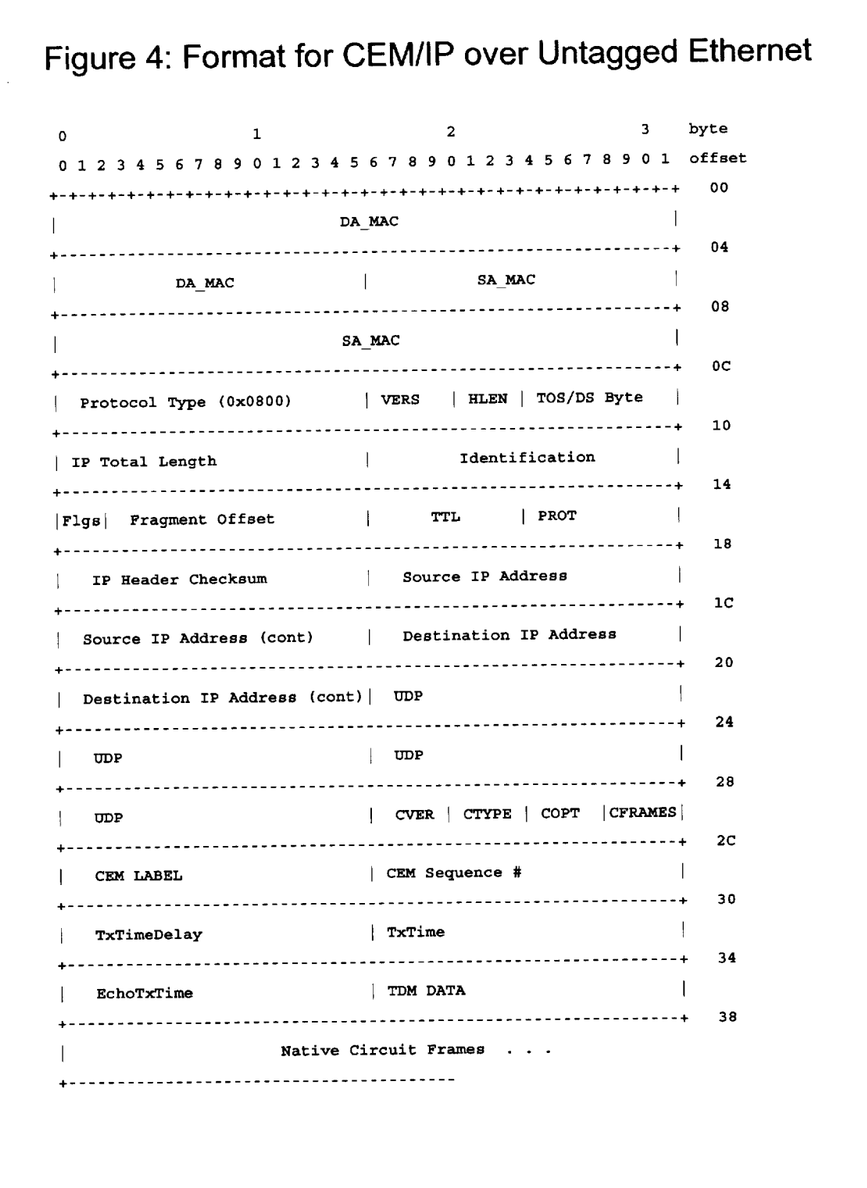
FIG. 4 shows the format of a CEM/IP packet carried over Ethernet without a VLAN tag in accordance with another version of the present invention.
Figure 5:
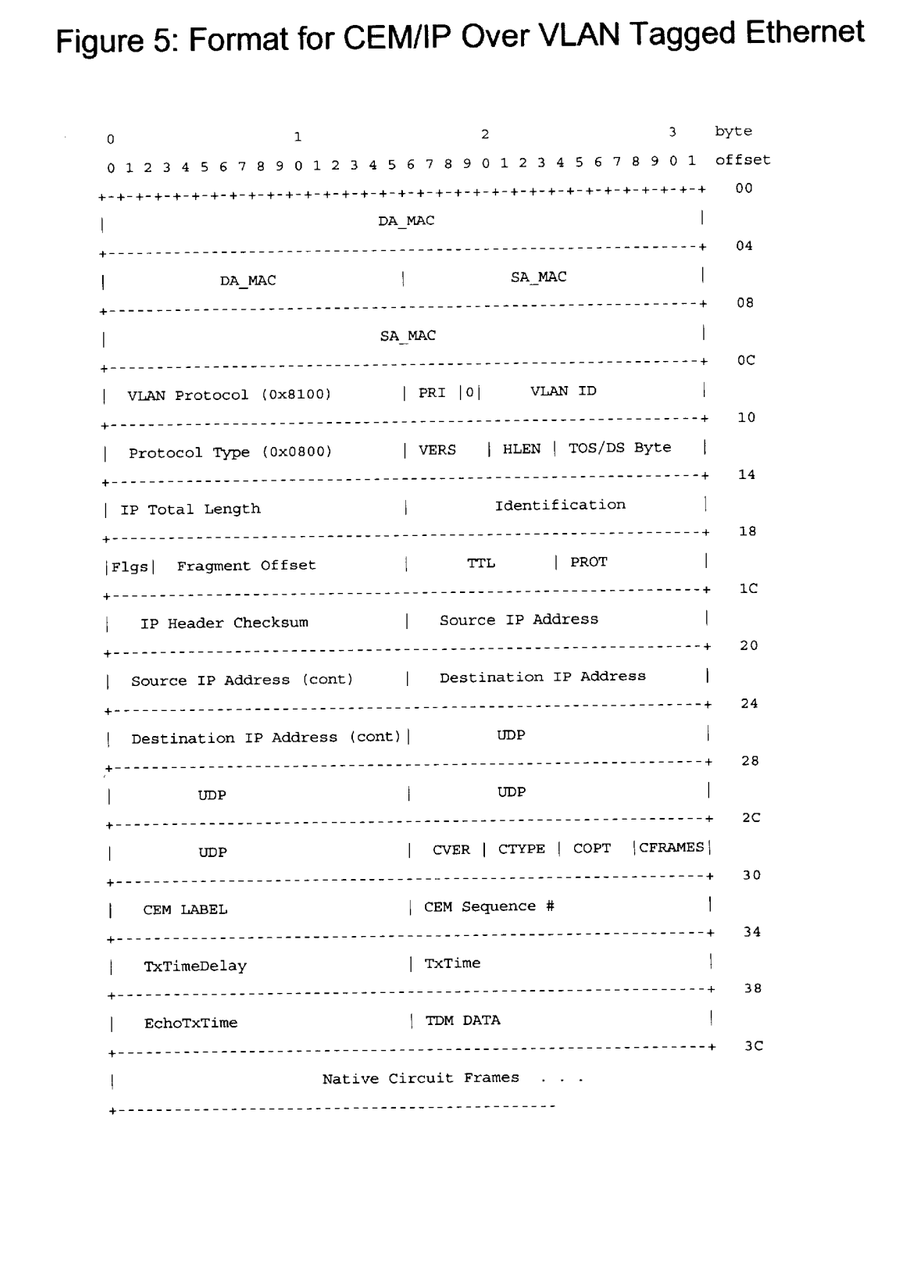
FIG. 5 shows the format of an IP packet carried over Ethernet with an explicit VLAN tag in accordance with another version of the present invention.

FIG. 4 shows the format of a CEM/IP packet carried over Ethernet with no VLAN tag. FIG. 5 shows the format of an IP packet carried over Ethernet with an explicit VLAN tag.

CEM Over MPLS

Figure 6:
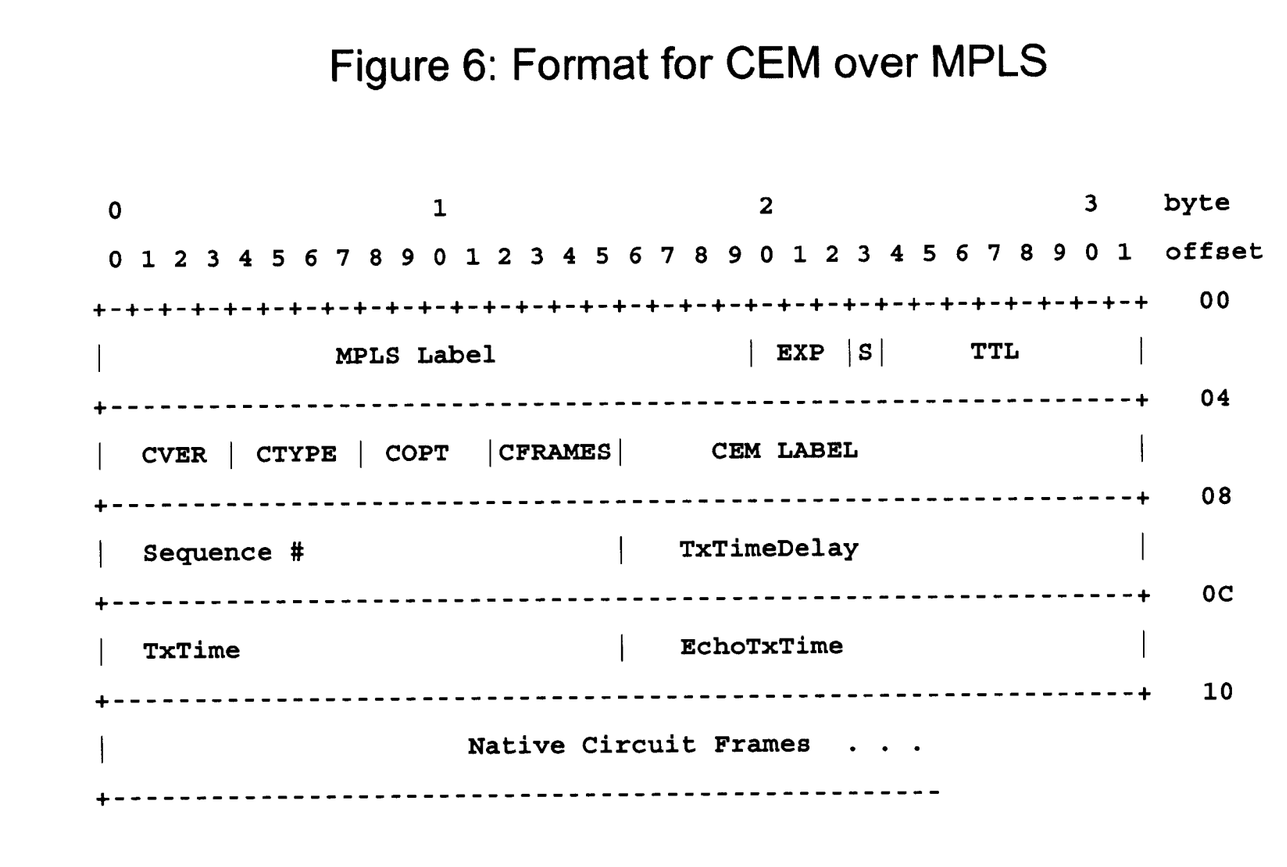
FIG. 6 shows a CEM PDU mapped to Multiprotocol Label Switching (MPLS) in accordance with another version of the present invention.

A Multiprotocol Label Switching (MPLS) label is 2 bytes in length. FIG. 6 shows a CEM PDU mapped to MPLS.

Figure 7:
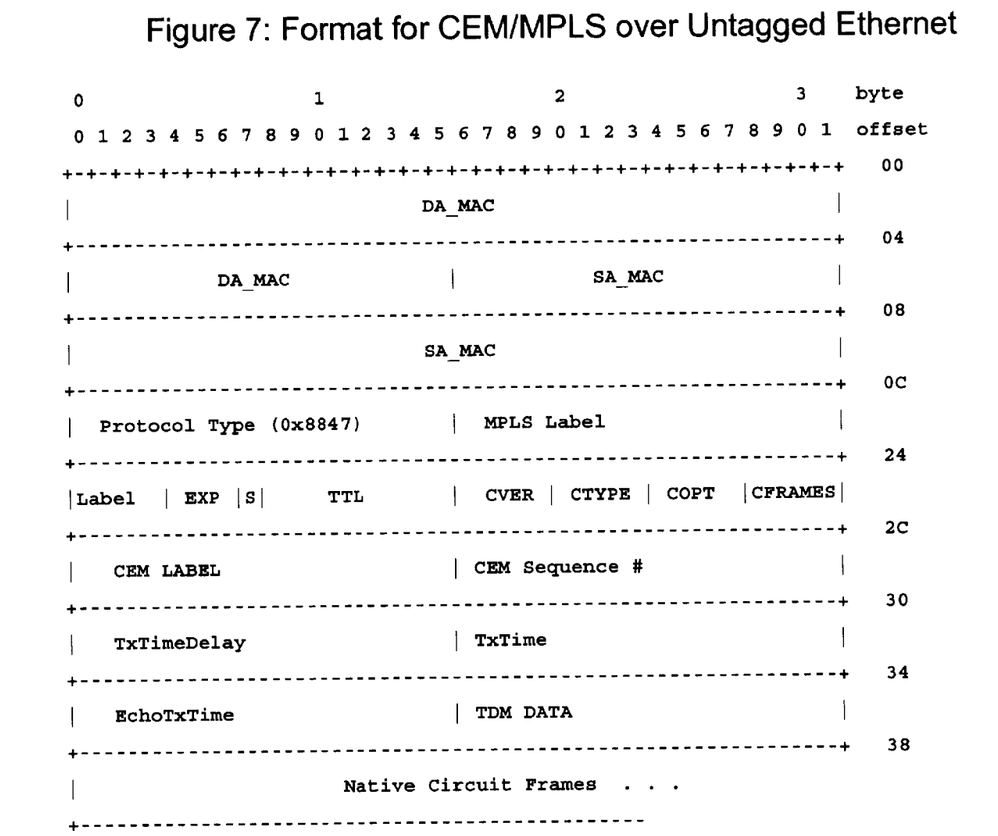
FIG. 7 shows a CEM/MPLS packet mapped to Ethernet, with no VLAN tag in accordance with another version of the present invention.

FIG. 7 shows a CEM/MPLS packet mapped to Ethernet, with no VLAN tag. Those of skill in the art understand the use of the VLAN tag for use in an architecture for Virtual Bridged LANS, such as found in IEEE Standard 802.1Q-1998 IEEE Standards for Local and Metropolitan Area Networks: Virtual Bridged Local Area Networks approved Dec. 8, 1998 by the IEEE-SA Standards Board.

Figure 8:
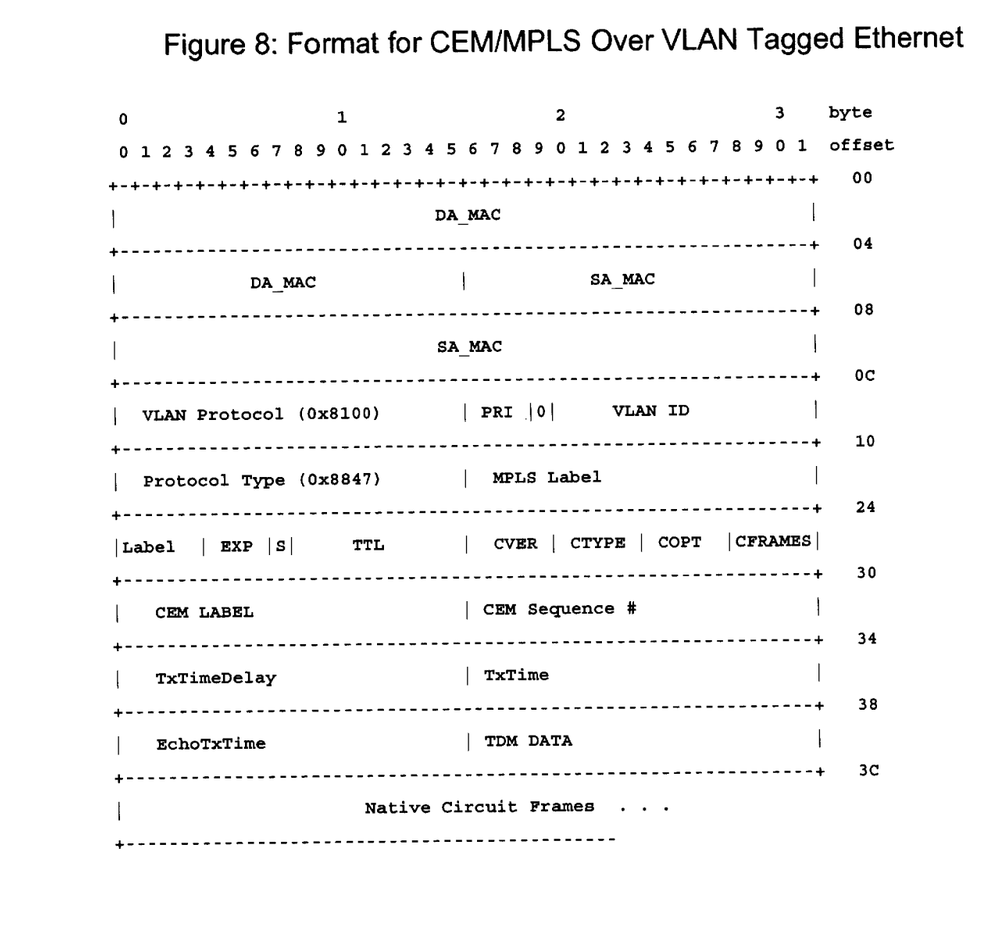
FIG. 8 shows a CEM/MPLS packet mapped to an Ethernet frame with an explicit VLAN tag in accordance with another version of the present invention.

FIG. 8 shows a CEM/MPLS packet mapped to an Ethernet frame with an explicit VLAN tag.

CEM Over Other Protocols

It will be apparent to someone skilled in the art that the CEM PDU shown in FIG. 1 may be mapped to other protocols. For example, the mapping shown in FIG. 3 may be combined with standard mappings of IP to ATM or Frame Relay to provide the transport of CEM over those protocols.

Measurement of RTD

The current invention measures RTD through the use of timestamps embedded in the CEM Packet.

General Processing Flow

A process to measure roundtrip delay from Unit A to Unit B and back to Unit A comprises:

Step 104—Unit A generates a circuit emulation packet (CEM PDU) and places the value of local time into the TxTime field (transmit time) into a field within the CEM PDU.

Step 108—Unit A transmits the packet to Unit B through a packet network.

Step 112—Unit B receives the transmitted packet and records the TxTime field from the received packet and Unit B starts a timer to measure TxTimeDelay.

Step 116—Unit B generates a CEM PDU and fills the TxTime field with local time, places the TxTimeDelay timer value in the TxTimeDelay field and copies the stored TxTime into EchoTx Time to send back the time received in the packet from Unit A. The TxTimeDelay contains the holding delay that occurred between the receipt of the packet at Unit B and the preparation of the packet for transmission to Unit A.

Step 120—Unit B transmits the packet to Unit A through the packet network.

Step 124—Unit A receives the transmitted packet and records the TxTime field from the received packet and Unit A starts a timer to measure TxTimeDelay.

Step 128—Unit A marks the local time then subtracts from local time the EchoTxTime and the TxTimeDelay obtained from the packet received from Unit B. This provides a Round Trip Delay. The one-way delay can be approximated as one half of the RTD time.

The actions at Unit A and Unit B are symmetric. As the process continues, the next packet back to Unit B will have enough information for Unit B to calculate a Round Trip Delay. Note that there is not any requirement that the local time clock in Unit A be synchronized to the local time clock in Unit B.

State Machine Diagram

Figure 9:
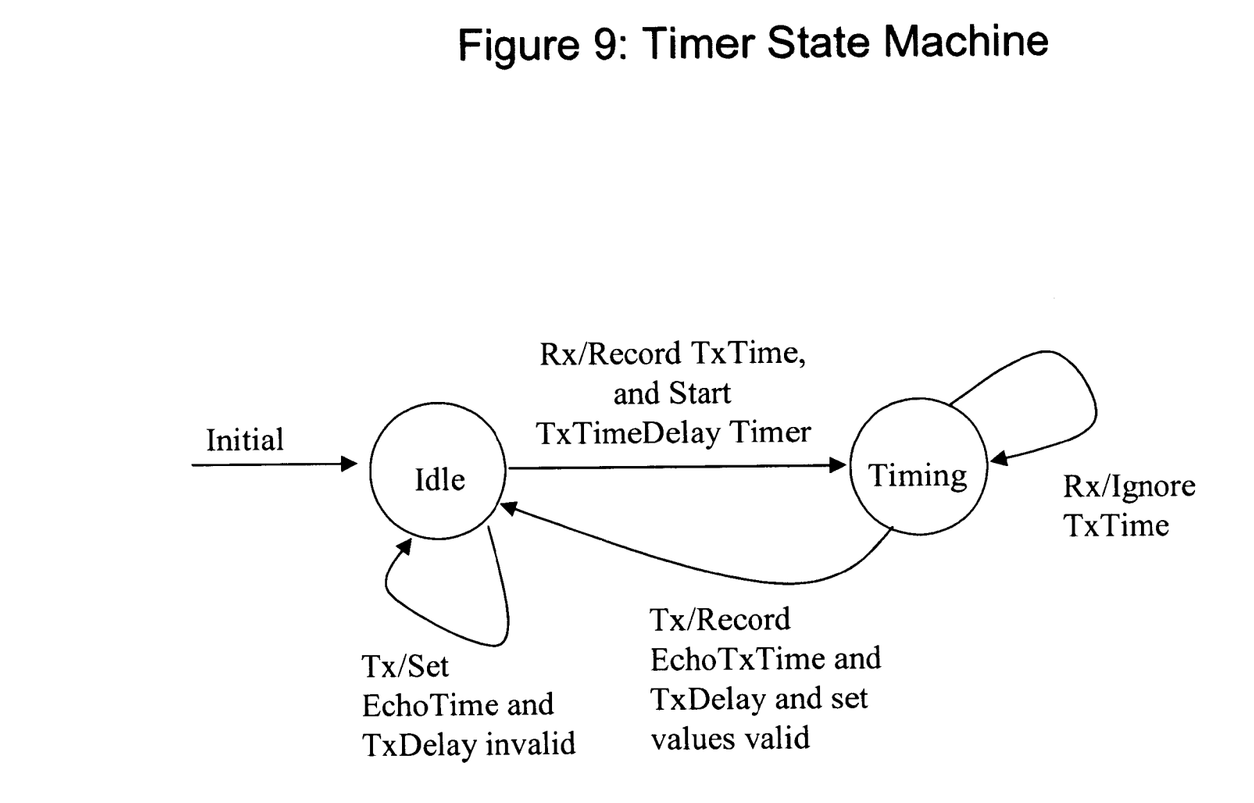
FIG. 9 shows the state machine for managing the TxTimeDelay timer and the time fields in the PDU in accordance with one version of the present invention.

FIG. 9 shows an implementation of a state machine for managing the TxTimeDelay timer and the time fields in the PDU.

State Machine Table

Table 2 describes the state machine depicted in FIG. 9.

TABLE 2

RTD State Machine

| | State | |
|---|---|---|
| Event | Idle | Timing |
| Received CEM PDU | 1. Record TxTime in EchoTxTime<br>2. Set TxTimeDelay = 0<br>3. →Timing | 1. Ignore TxTime |

TABLE 2-continued

RTD State Machine

| | State | |
|---|---|---|
| Event | Idle | Timing |
| Time to Send CEM PDU | 1. Set EchoTxTime and TxTimeDelay invalid in packet | 1. Record EchoTxTime and TxTimeDelay in packet and set valid 2. →Idle |

Notes:
1. The TxTime value in the packet will always be valid.
2. In the timing state the state machine is maintaining a timer until the next CEM PDU is to be sent. The TxTime of any packets received in this state is ignored. Thus, only one TxTimeDelay timer is needed per circuit.

RTD Measurement Example
Table 3 shows an example of RTP measurement.

TABLE 3

RTD Example

| | Unit A | | Unit B | | | | | Unit A | | |
|---|---|---|---|---|---|---|---|---|---|---|
| Time Index | Local Time | Event | Local Time | Curr State | Event | New State | Recv'd TxTime | TxTime Delay | Event | Recv. Time | RTD |
| 0 | 22 | | 342 | Idle | Receive #6 | Timing | 20 | 0 | | | |
| 1 | 23 | | 343 | Timing | | Timing | 20 | 1 | Receive #330 | 23 | 23 − 16 − 3 = 4 |
| 2 | 24 | Send #7 | 344 | Timing | | Timing | 20 | 2 | | | |
| 3 | 25 | | 345 | Timing | Send #331 | Idle | 20 | 3 | | | |
| 4 | 26 | | 346 | Idle | Receive #7 | Timing | 24 | 0 | | | |
| 5 | 27 | | 347 | Timing | | Timing | 24 | 1 | Receive #331 | 27 | 27 − 20 − 3 = 4 |
| 6 | 28 | Send #8 | 348 | Timing | | Timing | 24 | 2 | | | |
| 7 | 29 | | 349 | Timing | Send #332 | Idle | 24 | 3 | | | |
| 8 | 30 | | 350 | Idle | | Idle | 24 | — | | | |
| 9 | 31 | | 351 | Idle | | Idle | 24 | — | Receive #332 | 31 | 31 − 24 − 3 = 4 |
| 10 | 32 | Send #9 | 352 | Idle | | Idle | 24 | — | | | |
| 11 | 33 | | 353 | Idle | Send #333 | Idle | 24 | — | | | |
| 12 | 34 | | 354 | Idle | Receive #8 | Timing | 28 | 0 | | | |
| 13 | 35 | | 355 | Timing | Receive #9 | Timing | 28 | 1 | Receive #333 | 35 | No calculation |
| 14 | 36 | Send #10 | 356 | Timing | | Timing | 28 | 2 | | | |
| 15 | 37 | | 357 | Timing | Send #334 | Idle | 28 | 3 | | | |
| 16 | 38 | | 358 | Idle | Receive #10 | Timing | 36 | 0 | | | |
| 17 | 39 | | 359 | Timing | | Timing | 36 | 1 | Receive #334 | 39 | 39 − 28 − 3 = 8 |
| 18 | 40 | Send #11 | 360 | Timing | | Timing | 36 | 2 | | | |
| 19 | 41 | | 361 | Timing | Send #335 | Idle | 36 | 3 | | | |
| 20 | 42 | | 362 | Idle | Receive #11 | Timing | 40 | 0 | | | |
| 21 | 43 | | 363 | Timing | | Timing | 40 | 1 | Receive #335 | 43 | 43 − 36 − 3 = 4 |

The following time indices are of interest.

Time indices 0, 4, 16 and 20 show normal reception of a packet at Unit "B". The TxTime field is recorded, the TxTimeDelay timer is started and the state machine moves to the "Timing" state.

Time indices 3, 7, 15 and 19 show normal transmission of a packet from Unit "B". The previously received value of the TxTime field is placed in the EchoTxTime field of the outgoing packet, the TxTimeDelay timer is stopped and the state machine transitions to the "Idle" state.

Time index 11 shows Unit "B" sending a packet without a valid time measurement. The TxTimeDelay and EchoTxTime bits in the COPT field are set to 0 to reflect that this packet may not be used at Unit "A" to calculate RTD at time index 13.

Time index 13 shows packet #9 arriving at Unit B. Since Unit "B" is already in the "Timing" state, the packet is ignored as far as the RTD state variables are concerned.

Time indices 1, 5, 9, 17 and 21 show a normal calculation of RTD at Unit "A". The calculated value of RTD is 4 for each of these except for time index 8. Time index 8 properly shows a value of 8, reflecting the delayed arrival of packet #8 at Unit "B" at time index 12. Note the taking half of the RTD as an estimate of one way delay is only an approximation since the delays in this case were not symmetric.

Automatic Control of Flexible Mapping

Control of Mapping Multiple Circuits

When multiple circuits are destined for the same far end point, they will have the same IP destination address or MPLS Label. All such circuits can be mapped into the same packet using multiple CEM PDUs, with the COPT More flag set appropriately. Thus as illustrated in FIG. 2, a single transmission packet to be transmitted from device A to device B can contain a set of CEM PDUs that are all destined for Device B.

Control of Frames Per PDU (FPP)

As mentioned above, there is a trade-off in sending many partially loaded CEM PDU packets and thereby making inefficient use of the network, or waiting until the CEM PDU can be loaded with many payloads before sending. While the latter mode would send fewer packets, it would increase the average RTD because payloads would have to wait for a CEM PDU to become "full" and depart.

The present invention dynamically changes the balance between efficiency and responsiveness by altering the number of payload frames in a CEM PDU based on the RTD for recent transmissions. One-way delay may also be used, but it is not usually available directly.

Figure 10:
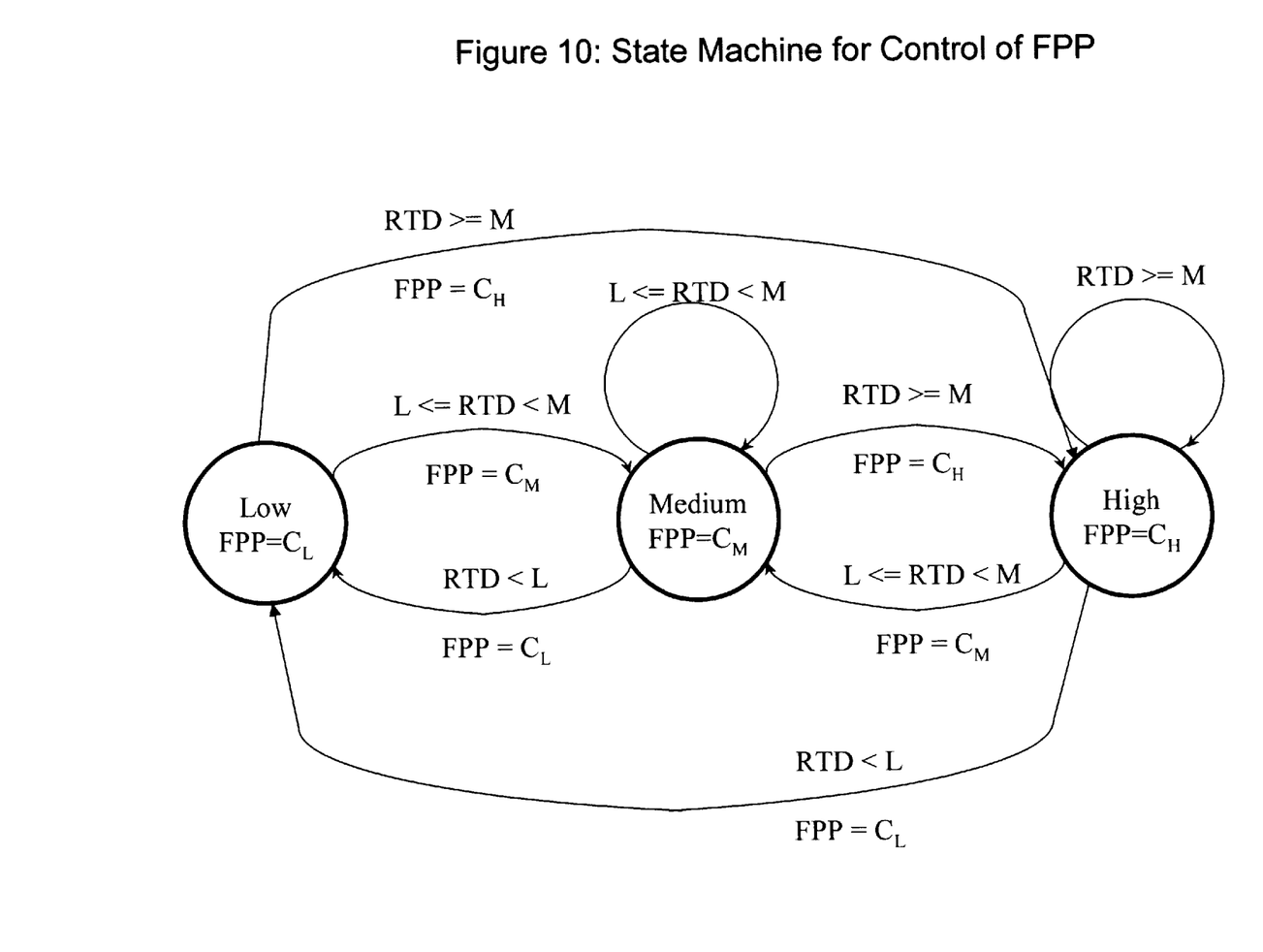
FIG. 10 shows the state machine to control the number of payload frames in a CEM PDU based on the RTD in accordance with one version of the present invention.

FIG. 10 shows the state machine. In a preferred embodiment of the present invention, there are three states, each with its own FPP value (Frames per Packet). This invention can be extended to any system that dynamically changes from one FPP value to another based on current conditions. Thus, the number of states can be any number two or larger. Two states would probably be too coarse. It is currently felt that the optimal number of states would be from 3 to 5 states to avoid having an unduly complex system. This disclosure will explain the concept through the use of a three state example.

The three states are:

Low—This is the steady state when the current RTD is low as defined by the threshold L.

Medium—This is the steady state when the current RTD is medium as defined by the thresholds L and M.

High—This is the steady state when the current RTD is high as defined by the threshold M.

Note that there are no timers in this state machine. Since the number of frames per CEM PDU is contained within the PDU, the FPP could change on every single PDU without impairing the operation of the system. Hysteresis (or control deadbands), holdoff timers and/or smoothing of the RTD samples could be introduced to prevent minor changes in RTD from triggering changes in state and FPP.

Table 4 shows the state transitions for each range of RTD.

TABLE 4

State Machine for Control of FPP

| RTD Status | State | | |
|---|---|---|---|
| | Low | Medium | High |
| RTD < L | No change | 1. Set FPP = $C_L$<br>2. →Low | 1. Set FPP = $C_L$<br>2. →Low |
| L <= RTD < M | 1. Set FPP = $C_M$<br>2. →Medium | No change | 1. Set FPP = $C_M$<br>2. →Medium |
| RTD >= M | 1. Set FPP = $C_H$<br>2. →High | 1. Set FPP = $C_H$<br>2. →High | No change |

Typical values for the values are:
L = 10 ms
M = 50 ms
$C_L$ = 20
$C_M$ = 10
$C_H$ = 1

For the convenience of the reader, applicant has added a number of topic headings to make the internal organization of this specification apparent and to facilitate location of certain discussions. These topic headings are merely convenient aids and not limitations on the text found within that particular topic.

Those skilled in the art will recognize that the methods and apparatus of the present invention has many applications and that the present invention is not limited to the specific examples given to promote understanding of the present invention. Moreover, the scope of the present invention covers the range of variations, modifications, and substitutes for the system components described herein, as would be known to those of skill in the art.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

Acronyms

| | |
|---|---|
| CEM | Circuit Emulation |
| CES | Circuit Emulation Service |
| FPP | Frames Per PDU |
| MPLS | Multiprotocol Label Switching - described in IETF RFC3031. |
| PDU | Protocol Data Unit |
| RTD | Round Trip Delay |
| TCP/IP | Transmission Control Protocol/Internet Protocol-a network control protocol for host-to-host transmissions over a packet switching communication network. |
| UDP | User Datagram Protocol - described in RFC 768. |
| VLAN | Virtual Local Area Network |

We claim:

1. A method for measuring round trip delay in a packet transmission network for the roundtrip delay for the transmission of a particular packet transmitted from a Device A to a Device B and for the transmission of a return packet back to the Device A, the method comprising:

A. transmitting from the Device A to the Device B the particular packet comprising: a set of at least two protocol data units with each protocol data unit comprising:

1.) a TxTime field representative of a time corresponding to the packet transmission from the Device A such that the TxTime field in a first protocol data unit is the same as the TxTime field in a second protocol data unit of the at least two protocol data units;

2.) an EchoTxTime representative of an earlier transmission time of a packet carrying an earlier particular protocol data unit from the Device B to the Device A;

3.) a TxTimeDelay representative of the interval between the receipt of the earlier particular protocol data unit from the Device B and the time value representative of the transmission of the particular packet containing this protocol data unit from the Device A to the Device B; and 4.) a protocol data unit payload;

B. receiving the transmitted particular packet at the Device B;

C. transmitting from the Device B to the Device A a return packet comprising: a set of at least two protocol data units with each protocol data unit comprising:

1.) a TxTime field representative of a time corresponding to the transmission of the return packet from the Device B such that the TxTime field in a first protocol data unit in the return packet is the same as the TxTime field in a second protocol data unit in the same return packet of the at least two protocol data units;

2.) an EchoTxTime representative of an earlier transmission time of the particular packet that carried a corresponding protocol data unit from the Device A to the Device B:

3.) a TxTimeDelay representative of the interval between the receipt of the particular protocol data unit from the Device A and the time corresponding to the transmission of the return packet containing this protocol data unit from the Device B to the Device A; and 4.) a protocol data unit payload;

D. receiving the return packet at the Device A; and

E. calculating round trio delay for the transmissions of the particular packet and the transmission of return packet.

2. The method of claim 1 wherein each protocol data unit further comprises a control field indicating whether another protocol data unit follows this protocol data unit in the transmitted packet.

3. A method of dynamically altering the number of frames per packet in a network transmitting packets from a Device A to a Device B, the method comprising:

A. measuring RTD-AB that is a round trip delay for a packet transmitted from the Device A; to the Device B and for a packet transmitted from the Device B to the Device A:

B. determining the number of frames to place in a new packet to be transmitted to from the Device A to the Device B using the measured RTD-AB value as an input until a new measurement is obtained for RTD-AB; and C. transmitting the new packet from the Device A to the Device B containing the selected number of frames wherein the transmitted new packet transmitted from the Device A to the Device B comprises a set of at least two protocol data units with each protocol data unit comprising:

1.) a TxTime field representative of a time corresponding to the new packet transmission from the Device A such that the TxTime field in a first protocol data unit equals the TxTime field in a second protocol data unit of the set of at least two protocol data units;

2.) an EchoTxTime representative of an earlier transmission time of a particular protocol data unit from the Device B to the Device A;

3.) a TxTimeDelay representative of the interval between the receipt of the particular protocol data unit from the Device B and the transmission of this protocol data unit from the Device A to the Device B; and 4.) a protocol data unit payload.

4. The method of claim 3 wherein each protocol data unit further comprises a control field indicating whether another protocol data unit follows this protocol data unit in the transmitted new packet.

* * * * *

UNITED STATES PATENT AND TRADEMARK OFFICE
CERTIFICATE OF CORRECTION

PATENT NO. : 6,768,748 B2
DATED : July 27, 2004
INVENTOR(S) : Pate et al.

It is certified that error appears in the above-identified patent and that said Letters Patent is hereby corrected as shown below:

<u>Column 9,</u>
Line 2, the word "trio" should read -- trip --.
Line 12, delete the ";" after "Device A".
Line 14, replace the ":" with -- ; -- after "Device A".

Signed and Sealed this

Twenty-eighth Day of September, 2004

JON W. DUDAS
*Director of the United States Patent and Trademark Office*